United States Patent
Ozawa et al.

(10) Patent No.: US 7,288,594 B2
(45) Date of Patent: *Oct. 30, 2007

(54) PROCESS FOR PRODUCING MODIFIED POLYMER MODIFIED POLYMER OBTAINED BY THE PROCESS AND RUBBER COMPOSITION

(75) Inventors: Youichi Ozawa, Tokyo (JP); Hajime Kondou, Tokyo (JP); Noriko Endou, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 87 days.

This patent is subject to a terminal disclaimer.

(21) Appl. No.: 10/497,462

(22) PCT Filed: Nov. 29, 2002

(86) PCT No.: PCT/JP02/12509

§ 371 (c)(1),
(2), (4) Date: Jun. 2, 2004

(87) PCT Pub. No.: WO03/048216

PCT Pub. Date: Jun. 12, 2003

(65) Prior Publication Data

US 2005/0020757 A1 Jan. 27, 2005

(30) Foreign Application Priority Data

Dec. 3, 2001 (JP) .............................. 2001-368916

(51) Int. Cl.
*C08F 8/00* (2006.01)
*C08J 3/00* (2006.01)
*C08K 3/34* (2006.01)
*C08L 47/00* (2006.01)
*C08L 83/00* (2006.01)

(52) U.S. Cl. ...................... 525/105; 152/151; 152/565; 264/36.14; 524/423; 524/424; 524/437; 524/445; 524/448; 524/449; 524/492; 524/493; 524/495; 524/496; 524/506; 524/521; 525/101; 525/332.9; 525/371

(58) Field of Classification Search ................ 524/506, 524/521, 448, 449, 445, 423, 424, 437, 492, 524/493, 495, 496; 525/101, 105, 332.9, 525/371; 264/36.14; 152/151, 565, 905
See application file for complete search history.

(56) References Cited

U.S. PATENT DOCUMENTS 6,008,295 A * 12/1999 Takeichi et al. ............ 525/105
6,294,624 B1    9/2001 Inoue et al.

FOREIGN PATENT DOCUMENTS

| JP | 2001-335663 A | 4/2001 |
|----|---------------|--------|
| JP | 2001-131230 A | 5/2001 |
| JP | 2001-131340 A | 5/2001 |
| JP | 2001-131343 A | 5/2001 |
| JP | 2001-131344 A | 5/2001 |
| JP | 2001-131345 A | 5/2001 |
| JP | 2001-158834 A | 6/2001 |
| JP | 2001-158835 A | 6/2001 |
| JP | 2001-158836 A | 6/2001 |
| JP | 2001-302703 A | 10/2001 |
| JP | 2001-302704 A | 10/2001 |

* cited by examiner

*Primary Examiner*—Patrick Niland
(74) *Attorney, Agent, or Firm*—Sughrue Mion Pllc.

(57) ABSTRACT

Provided is a process for producing a modified polymer, characterized by carrying out primary modification in which a hydrocarbyloxysilane compound is reacted with the active site of a polymer having an active site of an organic metal type in a molecule and then carrying out secondary modification in which the hydrocarbyloxysilane compound is further reacted therewith. This makes it possible to provide a modified polymer which enhances interactions with silica and carbon black when used for both of silica-blended and carbon black-blended rubber compositions and which elevates the fracture characteristic, the abrasion resistance and the low heat buildup property at the same time and can exhibit a good workability.

14 Claims, No Drawings

PROCESS FOR PRODUCING MODIFIED POLYMER MODIFIED POLYMER OBTAINED BY THE PROCESS AND RUBBER COMPOSITION

TECHNICAL FIELD

The present invention relates to a process for producing a modified polymer, a modified polymer obtained by the above process, a rubber composition and a pneumatic tire. More specifically, the present invention relates to a process for producing a modified polymer which enhances interactions with silica and carbon black when used for both of silica-blended and carbon black-blended rubber compositions and which elevates the fracture characteristic, the abrasion resistance and the low heat buildup property at the same time and can exhibit a good workability, a modified polymer having the characteristics described above, which is obtained by the process described above, a rubber composition comprising the above modified polymer and a pneumatic tire prepared by using the above rubber composition.

BACKGROUND ART

In recent years, social request to energy saving is allowing requirement to a reduction in fuel consumption of cars to be severer. In order to meet such requirement, a rolling resistance in tire performances is required to be reduced. A method for reducing a rolling resistance of a tire by optimizing a tire structure has been investigated, but it is carried out as the most usual method to use a material having a low heat buildup property as a rubber composition.

In order to obtain such a rubber composition as having a low heat buildup property, a large number of techniques for enhancing a dispersibility of a filler used for a rubber composition has so far been developed. Among them, particularly a method in which a polymerizable active site of a diene base polymer obtained by anionic polymerization using a lithium compound is modified with a functional group having interaction with a filler is getting most popular.

Known as the most representative method among such methods are a method in which carbon black is used as a filler and in which a polymerizable active site is modified with a tin compound (Japanese Patent Publication No. 87630/1993) and a method in which carbon black is used in the same manner and in which an amino group is introduced into a polymerizable active end (Japanese Patent Application Laid-Open No. 207342/1987).

On the other hand, in recent years, requirements not only to a low fuel consumption performance but also to a performance on a wet road surface (hereinafter referred to as a wet performance), particularly a braking performance has increased as concern about a safety of cars grows high. Accordingly, not only a mere reduction in a rolling resistance but also a high compatibility of a wet performance with a low fuel consumption performance are required to the performances of a rubber composition in a tire tread.

A method using silica in place of carbon black which has so far usually been used as a reinforcing filler has already been carried out as a method for obtaining a rubber composition providing a tire with such a good low fuel consumption and a good wet performance at the same time.

However, it has been apparent that when using silica as a reinforcing filler, a fracture strength and an abrasion resistance characteristic of a rubber composition can not be avoided from being notably reduced as compared with carbon black. Further, silica is inferior in dispersibility, and the workability in kneading has been a large problem in actually producing tires.

Accordingly, in order to obtain a rubber composition having a good thermal property, not only carbon black or silica is used alone, but also carbon black and silica are used in combination, and in addition thereto, required is an active site-modified polymer which has a wide interaction with a variety of such fillers and which can provide the fillers with a good dispersibility and the rubber composition with an abrasion resistance.

However, it is the existing situation that since an active site-modified polymer has so far been developed assuming that a single filler is used, active site-modified polymers having a satisfactory interaction with various fillers regardless of the kind of the fillers are restricted very much.

For example, the tin compound described above has a large dispersing effect against carbon black but little dispersing effect against silica, and in addition thereto, it does not exhibit a reinforcing effect at all. Further, a dispersing effect of aminosilane against silica is reported in Japanese Patent Application Laid-Open No. 151275/1997, but the effects thereof are not necessarily satisfactory.

On the other hand, disclosed is a method using alkoxysilane providing silica with a dispersing effect and an effect for improving a reinforcing property (Japanese Patent Application Laid-Open No. 188501/1989, Japanese Patent Application Laid-Open No. 53513/1996 and Japanese Patent Application Laid-Open No. 53576/1996). However, it is apparent that since an alkoxysilyl group does not have at all interaction with carbon black, no effects are expected when carbon black is used as a reinforcing filler. Also, the same shall apply to other active site-modified polymers, and a method using, for example, aminoacrylamide is disclosed (Japanese Patent Application Laid-Open No. 71687/1997 and Japanese Patent Application Laid-Open No. 208633/1997). However, while this method has an effect for improving a dispersibility of silica to some extent, an effect for improving a dispersibility of carbon black is scarcely observed, and the problem that the hysteresis loss goes up is observed in the cases of a rubber composition of a system in which carbon black and silica are used in combination and a rubber composition in which carbon black is blended.

Further, disclosed is a modified polymer obtained by introducing alkoxysilane having a dialkylamino group into an active end of a polymer obtained by anionic polymerization using alkyllithium or lithiumamide as a polymerization initiator (Japanese Patent Publication No. 53763/1994 and Japanese Patent Publication No. 57767/1994). When using this modified polymer, obtained are a reinforcing property corresponding to silica blended and a fixed dispersing effect to both silica and carbon black as well as a good workability, but because of an amino group which is a dialkyl group-substituted type having less effect to carbon black, particularly a blend system containing a large amount of carbon black is not provided with a satisfactory effect as compared with a case where a modified polymer obtained by using a tin base modifying agent is used.

On the other hand, a polymer having an active site used in producing a modified polymer is obtained usually by anionically polymerizing a conjugated diene compound alone or a conjugated diene compound with an aromatic vinyl compound. It is not easy in terms of characteristics in anionic polymerization to introduce a functional group such as a primary amino group and an organic onium base which are expected to be very effective for improving the physical properties into an active site of the above polymer obtained by anionic polymerization. Post polymerization treatment under severe conditions and an expensive protective group are required, and therefore the industrial value thereof is low.

In these methods, one functional group at most is introduced into an active site of a polymer, and such complicated synthetic techniques as using a dilithium base initiator and a macromonomer have to be used in order to introduce a plurality of the functional groups described above per molecule of the polymer. Accordingly, they are not methods which are liable to be industrially applied. Further, in producing a rubber composition, the physical properties are tried to be improved by subjecting the functional groups described above to heat mechanical treatment with a hydrocarbyl compound and a silane-modified polymer. In this case, the effects thereof are unsatisfactory, and in addition thereto, brought about are the problems that a valuable machine time of a kneading machine is spent and that an evaporating amount of alcohol in the kneading machine grows large. Thus, they are not methods which are industrially preferred.

Under such circumstances, an object of the present invention is to provide a process for producing a modified polymer which enhances interaction between silica and carbon black when used for both of silica-blended and carbon black-blended rubber compositions and which elevates a fracture characteristic, an abrasion resistance and a low heat buildup property at the same time and can exhibit a good workability, a modified polymer having the characteristics described above, which is obtained by the process described above, a rubber composition comprising the above modified polymer and a pneumatic tire prepared by using the above rubber composition.

DISCLOSURE OF THE INVENTION

Intensive researches repeated by the present inventors in order to achieve the object described above have resulted in finding that the above object can be achieved by a modified polymer obtained by a method in which a hydrocarbyloxysilane compound residue is first introduced into the active site of a polymer having an active site and in which this hydrocarbyloxysilane compound residue is then condensed with a hydrocarbyloxysilane compound. The present invention has been completer based on such knowledge.

That is, the present invention provides:
(1) a process for producing a modified polymer, characterized by carrying out primary modification in which a hydrocarbyloxysilane compound is reacted with the active site of a polymer having an active site of an organic metal type in a molecule and then carrying out secondary modification in which the hydrocarbyloxysilane compound is further reacted therewith,
(2) the process for producing a modified polymer as described in the above item (1), wherein the polymer described above is obtained by polymerizing a conjugated diene compound alone or a conjugated diene compound with other monomers,
(3) the process for producing a modified polymer as described in the above item (1) or (2), wherein metal in the active site described above is at least one selected from alkaline metals and alkaline earth metals,
(4) the process for producing a modified polymer as described in any of the above items (1) to (3), wherein a condensation-accelerating agent is added to the reaction system in the secondary modification,
(5) A modified polymer obtained by the production process as described in any of the above items (1) to (4),
(6) a rubber composition comprising the modified polymer as described in the above item (5),
(7) the rubber composition as described in the above item (6) comprising 100 parts by weight of (A) a rubber component containing at least 30% by weight of the modified polymer as described in the above item (5) and 10 to 100 parts by of (B) silica and/or carbon black and
(8) a pneumatic tire characterized by using the rubber composition as described in the above item (6) or (7).

THE MOST PREFERRED EMBODIMENT CARRYING OUT THE INVENTION

First, the production process for a modified polymer according to the present invention shall be explained.

In the production process for a modified polymer according to the present invention, carried out is primary modification in which a hydrocarbyloxysilane compound is introduced into the active site of a polymer having an active site of an organic metal type in a molecule, and then secondary modification in which the hydrocarbyloxysilane compound is further reacted therewith is carried out. These primary modification and secondary modification make it possible to introduce the hydrocarbyloxysilane compound residue into the active site described above in an amount of more than the equivalent.

The production process for a polymer having an active site of an organic metal type shall not specifically be restricted, and all of a solution polymerization method, a gas phase polymerization method and a bulk polymerization method can be used. In particular, the solution polymerization method is preferred. The polymerization form may be any of a batch system and a continuous system.

The metal in the active site described above is preferably one selected from alkaline metals and alkaline earth metals, and lithium metal is particularly preferred.

In the solution polymerization method described above, the targeted polymer is obtained, for example, by anionically polymerizing a conjugated diene compound alone or a conjugated diene compound with an aromatic vinyl compound using a lithium compound as a polymerization initiator.

Further, it is effective as well to activate a halogen atom contained in the polymer by an organic metal compound in the presence of a halogen-containing monomer. For example, it is effective as well to subject a bromine part of a copolymer containing an isobutylene unit, a paramethylstyrene unit and a parabromomethylstyrene unit to lithiation to convert it to an active site.

The active site described above may be merely present in a molecule of the polymer and shall not specifically be restricted. When the polymer is prepared by anionic polymerization using an alkaline metal compound and/or an alkaline earth metal compound as a polymerization initiator, the active site described above is located usually at an end of the polymer.

The conjugated diene compound described above includes, for example, 1,3-butadiene; isoprene; 1,3-pentadiene; 2,3-dimethylbutadiene; 2-phenyl-1,3-butadiene; and 1,3-hexadiene. They may be used alone or in combination of two or more kinds thereof, and among them, 1,3-butadiene and isoprene are particularly preferred.

The aromatic vinyl compound used for copolymerization with these conjugated diene compounds includes, for example, styrene; α-methylstyrene; 1-vinylnaphthalene; 3-vinyltoluene; ethylvinylbenzene; divinylbenzene; 4-cyclohexylbenzene; and 2,4,6-trimethylstyrene. They may be used alone or in combination of two or more kinds thereof, and among them, styrene is particularly preferred.

Further, when the conjugated diene compound and the aromatic vinyl compound are used as monomers to carry out copolymerization, 1,3-butadiene and styrene are particularly suitably used since they are excellent in terms of practicality such as an easiness in obtaining the monomers and an anionic polymerization characteristic which is a living property.

When the solution polymerization method is used, the monomer concentration in a solvent is preferably 5 to 50% by weight, more preferably 10 to 30% by weight. When the conjugated diene compound and the aromatic vinyl compound are used to carry out copolymerization, the aromatic vinyl compound contained in the charged monomer mixture has a content falling in a range of preferably 3 to 50% by weight, more preferably 5 to 45% by weight.

The lithium compound of the polymerization initiator shall not specifically be restricted, and hydrocarbyllithium and a lithium amide compound are preferably used. When hydrocarbyllithium of the former is used, obtained is a conjugated diene base polymer which has a hydrocarbyl group at a polymerization-initiating end and in which the other end is a polymerization active site. When the lithiumamide compound of the latter is used, obtained is a conjugated diene base polymer which has a nitrogen-containing group at a polymerization-initiating end and in which the other end is a polymerization active site.

The hydrocarbyllithium described above is preferably a compound having a hydrocarbyl group having 2 to 20 carbon atoms and includes, for example, ethyllithium, n-propyllithium, isopropyllithium, n-butyllithium, sec-butyllithium, tert-octyllithium, n-decyllithium, phenyllithium, 2-naphthyllithium, 2-butylphenyllithium, 4-phenyl-butyllithium, cyclohexyllithium, cyclopentyllithium and reaction products of diisopropenylbenzene with butyllithium. Among them, n-butyllithium is preferred.

On the other hand, the lithium amide compound includes, for example, lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithium methylbutylamide, lithium ethylbenzylamide and lithium methylphenethylamide. Among them, cyclic lithium amides such as lithium hexamethyleneimide, lithium pyrrolidide, lithium piperidide, lithium heptamethyleneimide and lithium dodecamethyleneimide are preferred in terms of an interaction effect against carbon black and a polymerization initiating ability, and lithium hexamethyleneimide and lithium pyrrolidide are particularly suited.

In these lithium amide compounds, usually the compounds prepared in advance from secondary amines and lithium compounds are used for polymerization in many cases, and they can be prepared as well in the polymerization system (in-situ). A use amount of the above polymerization initiator is selected in a range of preferably 0.2 to 20 millimole per 100 g of the monomer.

The process for producing the conjugated diene base polymer by anionic polymerization using the lithium compounds described above as a polymerization initiator shall not specifically be restricted, and conventionally known methods can be used.

To be specific, the targeted conjugated diene base polymer is obtained by anionically polymerizing the conjugated diene compound or the conjugated diene compound with the aromatic vinyl compound using the lithium compound described above as a polymerization initiator in the presence of a randomizer used if desired in an organic solvent which is inactive to the reaction, for example, a hydrocarbon base solvent such as aliphatic, alicyclic and aromatic hydrocarbon compounds.

The hydrocarbon base solvent described above is preferably a solvent having 3 to 8 carbon atoms, and capable of being given are, for example, propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene and ethylbenzene. They may be used alone or in a mixture of two or more kinds thereof.

The randomizer used if desired is a compound having actions such as controlling of a micro structure in the conjugated diene polymer, for example, an increase in a 1,2-bond of a butadiene part in a butadiene-styrene copolymer and a 3,4-bond in an isoprene polymer and controlling of a composition distribution of a monomer unit in a conjugated diene compound-aromatic vinyl compound copolymer, for example, a randomization in a butadiene unit and a styrene unit in a butadiene-styrene copolymer. This randomizer shall not specifically be restricted, and optional compounds can suitably be selected from publicly known compounds which have so far usually been used as randomizer and used. To be specific, capable of being given are ethers and primary amines such as dimethoxybenzene, tetrahydrofuran, dimethoxyethane, diethylene glycol dibutyl ether, diethylene glycol dimethyl ether, bistetrahydrofurylpropane, triethylamine, pyridine, N-methylmorpholine, N,N,N',N'-tetramethylethylenediamine and 1,2-piperidinoethane. Further, potassium salts such as potassium t-amylate and potassium t-butoxide and sodium salts such as sodium t-amylate can be used as well.

These randomizers may be used alone or in combination of two or more kinds thereof. A use amount thereof is selected preferably in a range of 0.01 to 1000 mole equivalent per mole of the lithium compound.

Temperature in this polymerization reaction is selected in a range of preferably 0 to 150° C., more preferably 20 to 130° C. The polymerization reaction can be carried out under generated pressure, and usually it is carried out preferably at pressure which is enough to maintain the monomer substantially to a liquid phase. That is, the higher pressure can be used if desired, though depending on the individual substances to be polymerized, the polymerizing solvent used and the polymerizing temperature, and such pressure can be obtained by a suitable method such as applying pressure to a reactor by gas which is inert to the polymerization reaction.

In this polymerization, all the raw materials taking part in the polymerization such as the polymerization initiator, the solvent, the monomers and the like are used preferably after removing reaction inhibiting substances such as water, oxygen, carbon dioxide and protic compounds.

When the polymer is obtained in the form of an elastomer, the resulting polymer or copolymer has preferably a glass transition point (Tg) of −90 to −15° C. which is determined by a differential thermal analytical method. It is difficult to obtain the polymer having a glass transition point of lower than −90° C. If it exceeds −15° C., the viscosity grows too high in a room temperature region, and handling is difficult in a certain case.

In the present invention, used is a method in which the hydrocarbyloxysilane compound I for the primary modification is added to the polymer thus obtained having an active site of an organic metal type in a molecule in an amount of preferably 0.5 mole equivalent or more of the apparent active site based on the above active site (usually, one mole of the above hydrocarbyloxysilane compound I for the primary modification corresponds to several mole equivalents of the active site) to react almost equivalent of the hydrocarbyloxysilane compound I based on the above active site to introduce the hydrocarbyloxysilane compound residue into almost all of the above active sites and in which the hydrocarbyloxysilane compound II for the secondary modification is then added to the reaction system to condense the hydrocarbyloxysilane compound residue introduced into the above active site with the hydrocarbyloxysilane compound II or the above residue with the unreacted hydrocarbyloxysilane compound I.

In the polymer used in the above modification reaction, at least 20% of the polymer chain preferably has the above active site.

In the modifying method described above, capable of being used as the hydrocarbyloxysilane compound I for the primary modification which is used for reacting with the active site of the polymer are a hydrocarbyloxysilane compound represented by Formula (I):

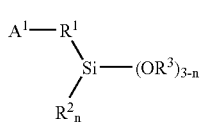

(wherein $A^1$ represents a monovalent group having at least one functional group selected from (thio)epoxy, (thio)isocyanate, (thio)ketone, (thio)aldehyde, cyan, pyridine, imine, amide, isocyanuric acid triesters, hydrocarbyl (thio)carboxylate, metal salts of (thio)carboxylic acid esters, carboxylic anhydride, carboxylic halides and dihydrocarbyl ester carbonate; $R^1$ represents a single bond or a divalent inert hydrocarbon group; $R^2$ and $R^3$ each represent independently a monovalent aliphatic hydrocarbon group having 1 to 20 carbon atoms or a monovalent aromatic hydrocarbon group having 6 to 18 carbon atoms; n is an integer of 0 to 2, and when a plurality of $OR^3$ is present, a plurality of $OR^3$ may be the same as or different from each other; and an active proton and an onium salt are not contained in the molecule) and/or a partially condensed product thereof. In this case, the partially condensed product means a compound in which a part (not the whole) of SiOR of the hydrocarbyloxysilane compound is combined via SiOSi by condensation.

In Formula (I) described above, among the functional groups in $A^1$, imine includes ketimine, aldimine and amidine, and (thio)carboxylates include unsaturated carboxylates such as acrylate and methacrylate. Alkaline metals, alkaline earth metals, Al, Sn and Zn can be given as metals in the metal salts of (thio)carboxylates.

An alkylene group having 1 to 20 carbon atoms can preferably be given as the divalent inactive hydrocarbon group represented by $R^1$. This alkylene group may be linear, branched or cyclic, and the linear group is particularly suited. The examples of the above linear alkylene group include methylene, ethylene, trimethylene, tetramethylene, pentamethylene, hexamethylene, octamethylene, decamethylene and dodecamethylene.

Capable of being given as $R^2$ and $R^3$ are an alkyl group having 1 to 20 carbon atoms, an alkenyl group having 2 to 20 carbon atoms, an aryl group having 6 to 18 carbon atoms and an aralkyl group having 7 to 18 carbon atoms. In this case, the alkyl group and the alkenyl group each described above may be linear, branched or cyclic, and the examples thereof include methyl, ethyl, n-propyl, isopropyl, n-butyl, isobutyl, sec-butyl, tert-butyl, pentyl, hexyl, octyl, decyl, dodecyl, cyclopentyl, cyclohexyl, vinyl, propenyl, allyl, hexenyl, octenyl, cyclopentenyl and cyclohexenyl.

The above aryl group may have a substituent such as a lower alkyl group on an aromatic ring, and the examples thereof include phenyl, tolyl, xylyl and naphthyl. Further, the above aralkyl group may have a substituent such as a lower alkyl group on an aromatic ring, and the examples thereof include benzyl, phenethyl and naphthylmethyl.

The term n is an integer of 0 to 2, preferably 0, and an active proton and an onium salt do not have to be contained in this molecule.

Capable of being preferably given as the hydrocarbyloxysilane compound represented by the above Formula (I) are, for example, (thio)epoxy group-containing hydrocarbyloxysilane compounds such as 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane and 2-(3,4-epoxycyclohexyl)ethyl(methyl)dimethoxysilane, and compounds obtained by substituting the epoxy groups in these compounds with a thioepoxy group. Among them, 3-glycidoxypropyltrimethoxysilane and 3-glycidoxypropyltriethoxysilane are particularly suited.

Capable of being preferably given as the imine group-containing hydrocarbyloxysilane compound are N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine and trimethoxysilyl compounds, methyldiethoxysilyl compounds, ethyldiethoxysilyl compounds, methyldimethoxysilyl compounds and ethyldimethoxysilyl compounds each corresponding to the above triethoxysilyl compounds. Among them, particularly suited are N-(1-methylpropylidene)-3-(triethoxysilyl)-1-propaneamine and N-(1,3-dimethylbutylidene)-3-(triethoxysilyl)-1-propaneamine. Another examples of the imine (amidine) group-containing compound include 1-[3-(triethoxysilyl)propyl]-4,5-dihydroimidazole, 1-[3-(trimethoxysilyl)propyl]-4,5-dihydroimidazole, N-(3-triethoxysilylpropyl)-4,5-dihydroimidazole, N-(3-isopropoxylsilylpropyl)-4,5-dihydroimidazole and N-(3-methyldiethoxysilylpropyl)-4,5-dihydroimidazole. Among them, N-(3-triethoxysilylpropyl)-4,5-dihydroimidazole is preferred.

Further, the other hydrocarbyloxysilane compounds include carboxylate group-containing compounds. To be specific, they include 3-methacryloyloxypropyltriethoxysilane, 3-methacryloyloxypropyltrimethoxysilane, 3-methacryloyloxypropylmethyldiethoxysilane and 3-methacryloyloxypropyltriisopropoxysilane. Among them, 3-methacryloyloxypropyltrimethoxysilane is preferred.

Also, the hydrocarbyloxysilane compound includes isocyanate group-containing hydrocarbyloxysilane compounds. To be specific, they include 3-isocyanatopropyltrimethoxysilane, 3-isocyanatopropyltriethoxysilane, 3-isocyanatopropylmethyldiethoxysilane and 3-isocyanatopropyltriisopropoxysilane. Among them, 3-isocyanatopropyltriethoxysilane is preferred.

Further, the hydrocarbyloxysilane compound includes carboxylic anhydride group-containing compounds. To be specific, they include 3-triethoxysilylpropylsuccinic anhydride, 3-trimethoxysilylpropylsuccinic anhydride and 3-methyldiethoxysilylpropylsuccinic anhydride. Among them, 3-triethoxysilylpropylsuccinic anhydride is preferred.

Further, 2-cyanoethyltriethoxysilane and 2-trimethoxysilylpyridine can be given as the other hydrocarbyloxysilane compounds.

These hydrocarbyloxysilane compounds (I) may be used alone or in combination of two or more kinds thereof.

Next, in the modifying method described above, capable of being used as the hydrocarbyloxysilane compound I for the primary modification which is used for reacting with the active site of the polymer are, for example, a hydrocarbyloxysilane compound represented by Formula (II):

(wherein $A^2$ represents a monovalent group having at least one functional group selected from cyclic tertiary amine, non-cyclic tertiary amine, pyridine, cyan, sulfide and multisulfide; $R^4$ represents a single bond or a divalent inert hydrocarbon group; $R^5$ and $R^6$ each represent independently a monovalent aliphatic hydrocarbon group having 1 to 20 carbon atoms or a monovalent aromatic hydrocarbon group having 6 to 18 carbon atoms; m is an integer of 0 to 2, and when a plurality of $OR^6$ is present, a plurality of $OR^6$ may be the same as or different from each other; and an active proton and an onium salt are not contained in the molecule) and/or a partially condensed product thereof In this case, the partially condensed product means the same one as described in Formula (I).

In Formula (II) described above, the non-cyclic tertiary amine represented by $A^2$ includes N,N-disubstituted aromatic amines such as N,N-disubstituted aniline, and the cyclic tertiary amine can contain a (thio)ether bond as a part of the ring. The divalent inactive hydrocarbon group represented by $R^4$ and $R^5$ and $R^6$ are the same as explained in $R^1$, $R^2$ and $R^3$ in Formula (I). An active proton and an onium salt do not have to be contained in the molecule.

Capable of being given as the hydrocarbyloxysilane compound represented by the above Formula (II) are, for example, non-cyclic tertiary amine group-containing hydrocarbyloxysilane compounds such as 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane and 3-dibutylaminopropyl(triethoxy)silane. Among them, 3-dimethylaminopropyl(triethoxy)silane and 3-dimethylaminopropyl(trimethoxy)silane are suited.

Capable of being given as the cyclic tertiary amine group-containing hydrocarbyloxysilane compounds are, for example, 3-(1-hexamethyleneimino)propyl(triethoxy)silane, 3-(1-hexamethyleneimino)propyl(trimethoxy)silane, (1-hexamethyleneimino)methyl(trimethoxy)silane, (1-hexamethyleneimino)methyl(triethoxy)silane, 2-(1-hexamethyleneimino)ethyl(triethoxy)silane, 2-(1-hexamethyleneimino)ethyl(trimethoxy)silane, 3-(1-pyrrolidinyl)propyl(triethoxy)silane, 3-(1-pyrrolidinyl)propyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, 3-(1-hexamethyleneimino)propyl(diethoxy)ethylsilane and 3-[10-(triethoxysilyl)decyl]-4-oxazoline. Among them, 3-(1-hexamethyleneimino)propyl(triethoxy)silane and (1-hexamethyleneimino)methyl(trimethoxy)silane can preferably be given. In particular, 3-(1-hexamethyleneimino)propyl(triethoxy)silane is suited.

Further, capable of being given as the other hydrocarbyloxysilane compounds are 2-(trimethoxysilylethyl)pyridine, 2-(triethoxysilylethyl)pyridine and 2-cyanoethyltriethoxysilane.

These hydrocarbyloxysilane compounds (II) may be used alone or in combination of two or more kinds thereof.

In the modifying method described above, capable of being used as the hydrocarbyloxysilane compound I for the primary modification which is used for reacting with the active site of the polymer are, for example, a hydrocarbyloxysilane compound represented by Formula (III):

(wherein $R^7$ and $R^8$ each represent independently a monovalent aliphatic hydrocarbon group having 1 to 20 carbon atoms or a monovalent aromatic hydrocarbon group having 6 to 18 carbon atoms; p is an integer of 0 to 2, and when a plurality of $OR^8$ is present, a plurality of $OR^8$ may be the same as or different from each other; and an active proton and an onium salt are not contained in the molecule) and/or a partially condensed product thereof In this case, the partially condensed product means the same one as described in Formula (I).

In Formula (III) described above, $R^7$ and $R^8$ are the same as explained in $R^2$ and $R^3$ in Formula (I) described above.

Capable of being preferably given as the hydrocarbyloxysilane compound represented by the above Formula (III) are, for example, tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, methyltrimethoxysilane, methyltriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, dimethyldimetoxysilane, methylphenyldimethoxysilane, vinyltrimethoxysilane, vinyltriethoxysilane, divinyldimethoxysilane and divinyldiethoxysilane. Among them, tetraethoxysilane is particularly suited.

These hydrocarbyloxysilane compounds (III) may be used alone or in combination of two or more kinds thereof.

In this primary modification, the optional mixtures of the hydrocarbyloxysilane compounds represented by Formulas (I), (II) and (III) can be used as the hydrocarbyloxysilane compound I for the primary modification which is used for reaction with the active site of the polymer.

In the modifying method of the present invention, the secondary modification is carried out subsequently to the primary modification. In this modifying method, the polymer having an active site is first reacted with the hydrocarbyloxysilane compound I added to introduce the hydrocarbyloxysilane compound residue into the above active site, and then carried out is the secondary modification in which the hydrocarbyloxysilane compound II newly added for the secondary modification or the unreacted hydrocarbyloxysilane compound remaining in the reaction system is condensed with the hydrocarbyloxysilane compound residue introduced into the active site.

Capable of being used as the hydrocarbyloxysilane compound II for the secondary modification is at least one selected from the hydrocarbyloxysilane compound represented by Formula (I) described above and/or the partially condensed product thereof, the hydrocarbyloxysilane compound represented by Formula (II) described above and/or the partially condensed product thereof and a hydrocarbyloxysilane compound represented by Formula (IV):

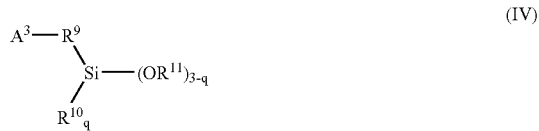

(wherein $A^3$ represents a monovalent group having at least one functional group selected from alcohol, thiol, amide, primary amine or an onium salt thereof, cyclic secondary amine or an onium salt thereof, non-cyclic secondary amine or an onium salt thereof, cyclic tertiary amine or an onium salt thereof, non-cyclic tertiary amine or an onium salt thereof, a group having an aryl or benzyl Sn bond, sulfonyl, sulfinyl and nitrile; $R^9$ represents a single bond or a divalent inert hydrocarbon group; $R^{10}$ and $R^{11}$ each represent independently a monovalent aliphatic hydrocarbon group having 1 to 20 carbon atoms or a monovalent aromatic hydrocarbon group having 6 to 18 carbon atoms; q is an integer of 0 to 2, and when a plurality of $OR^{11}$ is present, a plurality of $OR^{11}$ may be the same as or different from each other) and/or a partially condensed product thereof.

In Formula (IV) described above, the primary amine represented by $A^3$ includes aromatic amines such as aniline, and the non-cyclic secondary amine includes N-monosubstituted aromatic amines such as N-monosubstituted aniline. Further, the non-cyclic tertiary amine or the onium salt thereof includes N,N-disubstituted aromatic amines such as N,N-disubstituted aniline or onium salts thereof. In the case of the cyclic secondary amine and the cyclic tertiary amine, a (thio)ether bond can be contained therein as a part of the ring. The divalent inactive hydrocarbon group represented by $R^9$ and $R^{10}$ and $R^{11}$ are the same as explained in $R^1$, $R^2$ and $R^3$ in Formula (I) described above.

Capable of being preferably given as the hydrocarbyloxysilane compound represented by the above Formula (IV) are, for example, 3-aminopropyl-trimethoxysilane, 3-aminopropyltriethoxysilane, hydroxymethyltrimethoxysilane, hydroxymethyltriethoxysilane, mercaptomethyltrimethoxysilane, mercaptomethyltriethoxysilane, aminophenyl-trimethoxysilane, aminophenyltriethoxysilane, 3-(N-methylamino)propyltrimethoxysilane, 3-(N-methylamino)propyltriethoxysilane, octadecyldimethyl-(3-trimethylsilylpropyl)ammonium chloride, octadecyldimethyl(3-triethylsilylpropyl)ammonium chloride, cyanomethyltrimethoxysilane, cyanomethyl-triethoxysilane, sulfonylmethyltrimethoxysilane, sulfonylmethyltriethoxysilane, sulfinylmethyl-trimethoxysilane, sulfinylmethyltriethoxysilane, N-(2-aminoethyl)-3-aminopropyltrimethoxysilane and 2-(6-aminohexyl)aminopropyltrimethoxysilane.

These hydrocarbyloxysilane compounds II may be used alone or in combination of two or more kinds thereof.

An addition timing of the hydrocarbyloxysilane compound II for the secondary modification is usually after the primary modification, and the hydrocarbyloxysilane compounds represented by Formulas (I), (II) and (III) and/or the partially condensed products thereof may be added at the same time as the hydrocarbyloxysilane compound I for the primary modification. For example, when modifying the polymer having an active site of an organic metal type in a molecule with the hydrocarbyloxysilane compounds represented by Formulas (I) and (III), the compound represented by Formula (I) is reacted preferentially with the above active site and functions as the hydrocarbyloxysilane compound I for the primary modification. On the other hand, if a condensation-accelerating agent described later is added after the primary modification, the hydrocarbyloxysilane compounds represented by Formula (III) described above and the unreacted hydrocarbyloxysilane compound represented by Formula (I) described above function as the hydrocarbyloxysilane compound II for the secondary modification.

In the secondary modification, it is included as well in the scope of the present invention that the residue of the hydrocarbyloxysilane compound I described above introduced into the active site of the polymer is condensed with the unreacted hydrocarbyloxysilane compound added as the hydrocarbyloxysilane compound I to thereby introduce the hydrocarbyloxysilane compound residue into the above active site in an amount of larger than an equivalent.

This is readily achieved, for example, by adding a condensation-accelerating agent described later after the primary modification to condense the hydrocarbyloxysilane compound residue introduced into the active site of the polymer with the unreacted hydrocarbyloxysilane compound I. The hydrocarbyloxysilane compounds represented by Formulas (I) and (II) and/or the partially condensed products thereof are suitably used as the hydrocarbyloxysilane compound used in this case, and they can be used alone or in a mixture. In the above embodiment, the secondary modification goes on without adding the hydrocarbyloxysilane compound II for the secondary modification after the primary modification, and the hydrocarbyloxysilane compound II for the secondary modification may be added together with the condensation-accelerating agent after the primary modification.

In the modification reaction described above in the present invention (meaning the primary modification and the secondary modification), either of solution reaction and solid phase reaction can be used, and the solution reaction (allowed to contain the unreacted monomers used in the polymerization) is suited. The mode of this modification reaction shall not specifically be restricted, and it may be carried out by means of a batch type reactor or may be carried out by a continuous system using an apparatus such as a multistage continuous reactor and an inline mixer. It is important to carry out the above modification reaction before carrying out desolvent treatment, water treatment and heat treatment after finishing the polymerization reaction.

The modification reaction is carried out preferably at a temperature of 20° C. or higher. The polymerizing temperature of the conjugated diene base polymer can be used as it is, and more preferred range thereof includes 30 to 120° C. If the reaction temperature is lowered, shown are tendencies such as too much rise in a viscosity of the polymer, a deterioration in a dispersibility of the reaction product and a delay in a reaction rate in the secondary modification reaction. On the other hand, if the reaction temperature is elevated, the polymerizing active site tends to be liable to be deactivated.

In this modification reaction, the hydrocarbyloxysilane compound residue introduced into the active site of the polymer is condensed with the hydrocarbyloxysilane compound II or the unreacted hydrocarbyloxysilane compound I preferably in the presence of the condensation-accelerating agent. A combination of a metal compound known as a curing catalyst for alkoxy condensation curing type cold cross-linking (RTV) silicon and water can usually be used as the above condensation-accelerating agent, and a combination of carboxylate of tin and/or titanium alkoxide and water can preferably be given. Water may be added to the reaction system in the form of a solution of an organic solvent such as alcohol which is compatible with water or may be add and dispersed directly in a hydrocarbon solution using various chemical engineering methods.

The metal compound used as the condensation-accelerating agent is preferably a tin compound having an oxidation number of 2 represented by the following Formula (V):

$$S_n(OCOR^{12})_2 \quad (V)$$

(wherein $R^{12}$ represents an alkyl group having 2 to 19 carbon atoms), a tin compound having an oxidation number of 4 represented by the following Formula (VI):

$$R^{13}_x SnA^4_y B^1_{4-y-x} \quad (VI)$$

(wherein $R^{13}$ represents an aliphatic hydrocarbon group having 1 to 30 carbon atoms; x is an integer of 1 to 3, and y is 1 or 2; $A^4$ represents a group selected from a carboxyl group having 2 to 30 carbon atoms, an α,γ-dionyl group having 5 to 20 carbon atoms, a hydrocarbyloxy group having 3 to 20 carbon atoms and a siloxy group which is tri-substitute with a hydrocarbyl group having 1 to 20 carbon atoms and/or a hydrocarbyloxy group having 1 to 20 carbon atoms; and $B^1$ represents a hydroxyl group or halogen) and a titanium compound represented by the following Formula (VII):

$$A^5_z TiB^2_{4-z} \quad (VII)$$

(wherein $A^5$ represents a group selected from an alkoxy group having 3 to 20 carbon atoms and a siloxy group which is tri-substitute with an alkyl group having 1 to 20 carbon atoms and/or an alkoxy group having 1 to 20 carbon atoms; $B^2$ represents an α, γ-dionyl group having 5 to 20 carbon atoms; and z is 2 or 4).

To be more specific, capable of being suitably used are dicarboxylates of divalent tin, dicarboxylates of tetravalent dihydrocarbyltin (including bis(hydrocarbyldicarboxylic acid) salts), bis(α,γ-diketonate), alkoxy halide, monocarboxylate hydroxide, alkoxy(trihydrocarbyl siloxide), alkoxy (dihydrocarbyl alkoxysiloxide), bis(trihydrocarbyl siloxide) and bis(dihydrocarbyl alkoxysiloxide). The hydrocarbyl group bonded to tin has preferably 4 or more carbon atoms, particularly preferably 4 to 8 carbon atoms.

The titanium compound described above includes tetraalkoxide of titanium having an oxidation number of 4, dialkoxybis(α,γ-diketonate) and tetrakis(trihydrocarbioxide), and particularly tetrakis(trihydrocarbioxide) is suitably used.

Water is suitably used as it is or in the form of a solution of alcohol and the like or a micelle dispersed in a hydrocarbon solvent, and in addition thereto, capable of being effectively used as well, if necessary, is a moisture potentially contained in compounds which can release water in a reaction system, such as water adsorbed on a solid matter surface and hydrated water contained in a hydrate. Accordingly, it is given as the preferred embodiment as well to use a compound which can readily release water such as a solid matter having adsorbed water and a hydrate in combination with the metal compound described above.

These two components constituting the condensation-accelerating agent may be added separately to the reaction system or may be mixed immediately before use and added in the form of a mixture, but it is not preferred to store the mixture for a long period of time since the metal compound is decomposed.

A use amount of the above condensation-accelerating agent is preferably selected so that both mole ratios of metal and a proton source in the metal compound described above based on the whole amount of the hydrocarbyloxysilyl bond present in the system are 0.1 or more.

Both mole numbers of metal contained in the metal compound described above and water which is effective for the reaction are preferably 0.1 or more in terms of a mole ratio based on the whole amount of the hydrocarbyloxysilyl group present in the system. The upper limit thereof is varied according to the purposes and the reaction conditions, and preferably present is 0.5 to 3 mole equivalent of effective water based on an amount of the hydrocarbyloxysilyl group bonded to the active site of the polymer at a stage before the condensation treatment.

In the present invention, publicly known antioxidants and short stopping agents for the purpose of terminating the polymerization reaction can be added, if desired, in a step after introducing the hydrocarbyloxysilane compound residue into the active site in the modification reaction. Further, a condensation-inhibiting agent such as higher carboxylic acid esters of polyhydric alcohols may be added to the reaction system after finishing the modification reaction.

Conventionally known after-treatments such as desolvent are carried out after finishing the modification treatment in the manner described above, and thus the targeted modified polymer can be obtained. A polymerization chain active site-modified group of the above polymer can be analyzed by means of a high performance liquid chromatography (HPLC) and a nuclear magnetic resonance spectroscopy (NMR).

The above modified polymer has a Mooney viscosity ($ML_{1+4}$, 100° C.) of preferably 10 to 150, more preferably 15 to 70. If the Mooney viscosity is less than 10, the rubber physical properties including the fracture characteristic are not sufficiently obtained. On the other hand, if it exceeds 150, the workability is deteriorated, and it is difficult to mix the polymer with the blending components.

The present invention provides as well the modified polymer obtained in the manner described above.

When the modified polymer of the present invention is used as a rubber component in silica-blended and carbon black-blended rubber compositions, it can raise the interaction against both of silica and carbon black, elevate the rapture characteristic, the abrasion resistance and the low heat buildup property at the same time and exhibit the good workability.

The rubber composition of the present invention contains the modified polymer obtained by the process described above, and usually used is the composition comprising 100 parts by weight of (A) a rubber component containing at least 30% by weight of the above modified polymer and 10 to 100 parts by of (B) silica and/or carbon black.

In the rubber composition of the present invention, at least 30% by weight of the modified polymer described above is preferably contained as the rubber component of the component (A). If this amount is less than 30% by weight, the rubber composition having desired physical properties is less liable to be obtained, and the objects of the present invention are not achieved in a certain case. The modified polymer contained in the rubber component has a content of more preferably 35% by weight or more, particularly suitably 40 to 100% by weight.

The above modified polymers may be used alone or in combination of two or more kinds thereof. The rubber component used in combination with the above modified polymer includes natural rubber and diene base synthetic rubber, and the diene base synthetic rubber includes, for example, styrene-butadiene copolymers (SBR), polybutadiene (BR), polyisoprene (IR), butyl rubber (IIR), ethylene-propylene copolymers and mixtures thereof Further, it may be a compound partially provided with a branched structure by using a multifunctional modifying agent, for example, a modifying agent such as tin tetrachloride.

In the rubber composition of the present invention, silica and/or carbon black are preferably used as a reinforcing filer of the component (B).

The silica described above shall not specifically be restricted, and it can optionally be selected from compounds which have so far conventionally been used as a reinforcing filler for rubber.

The above silica includes, for example, wet silica (hydrous silicic acid), dry silica (anhydrous silicic acid), calcium silicate and aluminum silicate, and among them, preferred is wet silica in which an effect for improving the rapture characteristic and a compatible effect with the wet gripping property are the most notable. On the other hand, carbon black shall not specifically be restricted, and it can optionally be selected from compounds which have so far conventionally been used as a reinforcing filler for rubber. This carbon black includes, for example, FEF, SRF, HAF, ISAF and SAF. Preferred is carbon black having an iodine adsorption number (IA) of 60 mg/g or more and a dibutyl phthalate absorption (DBP) of 80 ml/100 g or more. An effect for improving various physical properties is increased by using the above carbon black, and HAF, ISAF and SAF which are excellent in an abrasion resistance are particularly preferred.

A blending amount of the reinforcing filer of the above component (B) is preferably 10 to 100 parts by weight per 100 parts by weight of the rubber component of the component (A). If a blending amount of the reinforcing filer of the above component (B) is less than 10 parts by weight per 100 parts by weight of the rubber component of the component (A), an effect for improving the reinforcing property and the other physical properties is less liable to be sufficiently exhibited. On the other hand, if it exceeds 100 parts by weight, it causes a reduction in the processability. Considering the reinforcing property, the other physical properties and the processability, the blending amount of the above component (B) falls particularly preferably in a range of 20 to 60 parts by weight.

In the rubber composition of the present invention, when silica is used as the reinforcing filer of the component (B), a silane coupling agent can be blended for the purpose of further raising the reinforcing property. This silane coupling agent includes, for example, bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamonyl tetrasulfide, 3-trimethoxysilylpropylbenzothiazole tetrasulfide, 3-triethoxysilylpropylbenzothiazolyl tetrasulfide, 3-triethoxysilylpropylmethacrylate monosulfide, 3-trimethoxysilylpropylmethacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide and dimethoxymethylsilylpropyl-benzothiazole tetrasulfide. Among them, bis(3-triethoxysilylpropyl)tetrasulfide and 3-trimethoxysilylpropylbenzothiazolyl tetrasulfide are suited in terms of an effect for improving the reinforcing property. These silane coupling agents may be used alone or in combination of two or more kinds thereof.

In the rubber composition of the present invention, the modified polymer in which a functional group having a high affinity to silica is introduced into a molecular active site is used as the rubber component, and therefore a blending amount of the silane coupling agent can be reduced more than those of usual cases. The preferred blending amount of the silane coupling agent is varied according to the kind of the silane coupling agent, and it is selected in a range of preferably 1 to 20% by weight based on the silica. If this amount is less than 1% by weight, the effect of the coupling agent is less liable to be sufficiently exhibited. On the other hand, if it exceeds 20% by weight, a gelation in the rubber component is likely to be brought about. The preferred blending amount of the above silane coupling agent falls in a range of 5 to 15% by weight in terms of the effects of the coupling agent and a prevention in gelation.

Various chemicals usually used in the rubber industry, for example, vulcanizing agents, vulcanization-accelerating agents, process oils, antioxidants, scorch preventives, zinc oxide and stearic acid can be added to the rubber composition of the present invention as long as the objects of the present invention are not damaged.

The vulcanizing agent described above includes sulfur, and a use amount thereof is preferably 0.1 to 10.0 parts by weight, more preferably 1.0 to 5.0 parts by weight in terms of sulfur per 100 parts by weight of the rubber component. If it is less than 0.1 part by weight, the vulcanized rubber is likely to be reduced in a rapture strength, an abrasion resistance and a low heat buidup property. On the other hand, it exceeds 10.0 parts by weight, it causes a loss in the rubber elasticity.

The vulcanization-accelerating agent which can be used in the present invention shall not specifically be restricted, and capable of being given are, for example, vulcanization-accelerating agents of a benzothiazole base such as M (2-mercaptobenzothiazole), DM (dibenzothiazyl disulfide), CZ (N-cyclohexyl-2-benzothiazylsulfenamide) and a guanidine base such as DPG (diphenylguanidine). A use amount thereof is preferably 0.1 to 5.0 parts by weight, more preferably 0.2 to 3.0 parts by weight per 100 parts by weight of the rubber component.

The process oil which can be used in the rubber composition of the present invention includes, for example, a paraffin base, a naphthene base and an aromatic base. The aromatic base is used for uses in which the tensile strength and the abrasion resistance are regarded as important, and the naphthene base or the paraffin base is used for uses in which the hysteresis loss and the low heat buildup characteristic are regarded as important. A use amount thereof is preferably 0 to 100 parts by weight per 100 parts by weight of the rubber component, and if it exceeds 100 parts by weight, a tensile strength and a low heat buildup property of the vulcanized rubber tend to be deteriorated.

The rubber composition of the present invention is obtained by kneading by means of a kneading machine such as a roll and an internal mixer, and it is vulcanized after mold-processed and can be used for uses such as rubber vibration insulator, belts, hoses and other industrial products as well as tire uses such as tire treads, under treads, side walls, carcass coating rubber, belt coating rubber, bead fillers, chafers and bead coating rubber. In particular, it can suitably be used as rubber for tire treads.

The pneumatic tire of the present invention is used by a conventional method using the rubber composition of the present invention. That is, the rubber composition of the present invention containing, if necessary, various chemicals in the manner described above is processed into the respective members at a stage where the rubber composition is not vulcanized, and they are stuck and molded by means of a tire molding machine by a conventional method, whereby a green tire is molded. This green tire is heated and pressed in a vulcanizing machine to obtain a tire.

The pneumatic tire of the present invention obtained in the manner described above has a good low fuel consumption and is excellent particularly in a rapture characteristic and an abrasion resistance, and in addition thereto, the above rubber composition has a good processability, so that the productivity is excellent as well.

EXAMPLES

Next, the present invention will be described more specifically with reference to examples in the following. However the present invention is not limited to the examples.

The physical properties of the polymer were measured by methods described below.

<<Physical Properties of Polymer:>>

A number average molecular weight (Mn) and a weight average molecular weight (Mw) of the polymer were measured by gel permeation chromatography (GPC: HLC-8020 manufactured by Toso Co., Ltd., column: GMH-XL (two serial columns) manufactured by Toso Co., Ltd.), and the differential refractive index (RI) was used to calculate them in terms of polystyrene with monodispersed polystyrene used as a standard.

A micro structure in a butadiene part of the polymer was determined by an infrared method (Molero method), and a styrene unit content in the polymer was calculated from an integral ratio in a $^1$H-NMR spectrum.

A Mooney viscosity of the polymer was measured at 100° C. by means of an RLM-01 type tester manufactured by Toyo Seiki Co., Ltd.

Further, the physical properties of the vulcanized rubber were measured by the following methods, and a Mooney viscosity of the rubber composition was measured in the following manner.

<<Physical properties of vulcanized rubber:>>

(1) Low Heatbuildup Property

The tan δ (50° C.) was measured at a temperature of 50° C., a distortion of 5% and a frequency of 15 Hz by means of a viscoelasticity measuring apparatus (manufactured by Rheometrix Co., Ltd.). The smaller the tan δ (50° C.), the larger the low heat buildup property.

(2) Fracture Characteristic (Tensile Strength)

The tensile strength at break($T_b$) was measured according to JIS K6301-1955.

(3) Abrasion Resistance

A Lanborn type abrasion tester was used to measure the abrasion amount at a slip rate of 60% at a room temperature, and it was shown by an index in terms of an abrasion resistance index, wherein an abrasion index of a control was set to 100. The larger the index, the better the abrasion resistance.

<<Mooney viscosity of rubber composition:>>

The Mooney viscosity ($ML_{1+4}$/130° C.) was measured at 130° C. based on JIS K6300-1994.

The dried and refined raw materials were used for polymerization unless otherwise described.

Comparative Production Example 1

Production of Non-modified Polymer

A pressure proof glass vessel of 800 ml which was dried and substituted with nitrogen was charged with 300 g of cyclohexane, 40 g of 1,3-butadiene, 10 g of styrene and 0.34 millimole of 2,2-ditetrahydrofurylpropane, and 0.38 millimole of n-butyllithium (BuLi) was added thereto, followed by carrying out polymerization at 50° C. for 1.5 hour. The polymerization conversion rate was almost 100%.

Then, 0.5 ml of an isopropanol 5 weight % solution of 2,6-di-t-butyl-p-cresol (BHT) was further added to the polymerization system to terminate the polymerization, and the product was dried by a conventional method to thereby obtain a polymer A. The analytical values of the polymer thus obtained are shown in Table 1.

Comparative Production Example 2

Production of One Stage-modified Polymer

A pressure proof glass vessel of 800 ml which was dried and substituted with nitrogen was charged with 300 g of cyclohexane, 40 g of 1,3-butadiene, 10 g of styrene and 0.38 millimole of 2,2-ditetrahydrofurylpropane, and 0.42 millimole of n-butyllithium (BuLi) was added thereto, followed by carrying out polymerization at 50° C. for 1.5 hour. The polymerization conversion rate was almost 100%.

Tetraethoxysilane 0.352 millimole was added to the polymerization system, and then modification reaction was further carried out at 50° C. for 30 minutes. Thereafter, 0.5 ml of an isopropanol 5 weight % solution of 2,6-di-t-butyl-p-cresol (BHT) was added to the polymerization system to terminate the polymerization, and the product was dried by a conventional method to thereby obtain a polymer B. The analytical values of the polymer thus obtained are shown in Table 1.

Comparative Production Examples 3 to 7

Production of One Stage-modified Polymers

Polymer C to Polymer G were obtained in the same manner as in Comparative Production Example 2, except that in Comparative Production Example 2, modifying agents of kinds shown in Table 1 were substituted for tetraethoxysilane which was a modifying agent. The analytical values of the respective polymers thus obtained are shown in Table 1.

Production Example 1

Production of Two Stage-modified Polymer

A pressure proof glass vessel of 800 ml which was dried and substituted with nitrogen was charged with 300 g of cyclohexane, 40 g of 1,3-butadiene, 10 g of styrene and 0.38 millimole of 2,2-ditetrahydrofurylpropane, and 0.42 millimole of n-butyllithium (BuLi) was added thereto, followed by carrying out polymerization at 50° C. for 1.5 hour. The polymerization conversion rate was almost 100%.

Tetraethoxysilane 0.38 millimole was added to the polymerization system, and then modification reaction of the first stage was further carried out at 50° C. for 30 minutes. Thereafter, 0.38 millimole of N-(3-triethoxysilylpropyl)-4,5-dihydroimidazole, 2.28 millimole of tin bis(2-ethylhexanoate) and 2.28 millimole of water were further added to the polymerization system, and then modification reaction of the second stage was carried out at 50° C. for 60 minutes. In this case, 0.5 ml of an isopropanol 5 weight % solution of 2,6-di-t-butyl-p-cresol (BHT) was added to terminate the polymerization, and then the product was dried by a conventional method to thereby obtain a polymer H. The analytical values of the polymer thus obtained are shown in Table 1.

Production Examples 2 to 14

Production of Two Stage-modified Polymers

Polymer I to Polymer U were obtained in the same manner as in Production Example 1, except that in Production Example 1, tetraethoxysilane and/or N-(3-triethoxysilylpropyl)-4,5-dihydroimidazole which were the modifying agents were changed to modifying agents of kinds shown in Table 1. The analytical values of the polymers thus obtained are shown in Table 1.

Production Example 15

Production of Two Stage-modified Polymers

Polymer V was obtained in the same manner as in Production Example 1, except that in Production Example 1, titanium tetrakis(2-ethylhexyl oxide) was substituted for tin bis(2-ethylhexanoate) which was a condensation-accelerating agent. The analytical values of the polymer thus obtained are shown in Table 1.

Production Example 16

Production of Two Stage-modified Polymers

Polymer W was obtained in the same manner as in Production Example 1, except that in Production Example 1, lithium hexamethyleneimide (hexamethyleneimide/Li mole ratio=0.9) of 0.42 millimole in terms of lithium equivalent which was prepared in the polymerization system was substituted for n-butyllithium which was a polymerization initiator. The analytical values of the polymers thus obtained are shown in Table 1.

Comparative Production Example 8

Production of one Stage-modified Polymer

Polymer X was obtained in the same manner as in Comparative Production Example 2, except that in Comparative Production Example 2, lithium hexamethyleneimide (hexamethyleneimide/Li mole ratio=0.9) of 0.42 millimole in terms of lithium equivalent which was prepared in the polymerization system was substituted for n-butyllithium which was a polymerization initiator. The analytical values of the polymers thus obtained are shown in Table 1.

TABLE 1-1

| | | | Comparative Production Example | | | | |
|---|---|---|---|---|---|---|---|
| | | | 1 | 2 | 3 | 4 | 5 |
| Kind of polymer | | | A | B | C | D | E |
| Polymerization initiator | | Kind | BuLi | BuLi | BuLi | BuLi | BuLi |
| | | Amount (mmole) | 0.38 | 0.42 | 0.42 | 0.42 | 0.42 |
| First stage modification | Modifying agent | Kind | — | TEOS | TTC | TEOSPDI | DMBTESPA |
| | | Amount (mmole) | — | 0.352 | 0.352 | 0.352 | 0.352 |
| Second stage modification | Modifying agent | Kind | — | — | — | — | — |
| | | Amount (mmole) | — | — | — | — | — |
| | Condensing agent | Kind | — | — | — | — | — |
| | | Amount (mmole) | — | — | — | — | — |
| Characteristic | Molecular weight ($\times 10^4$) | Base Mw | 23.0 | 20.8 | 21.5 | 20.1 | 19.0 |
| | | Total Mw | 23.0 | 42.5 | 67.0 | 31.0 | 26.8 |
| | Micro structure (wt %) | Styrene unit content | 20.0 | 19.8 | 20.0 | 19.5 | 20.1 |
| | | Vinyl group content | 57 | 57 | 56 | 58 | 54 |
| Mooney viscosity ($ML_{1+4}$/100° C.) | | | 24 | 52 | 78 | 33 | 32 |

TABLE 1-2

|  |  |  | Comparative Production Example | | Production Example | | |
|---|---|---|---|---|---|---|---|
|  |  |  | 6 | 7 | 1 | 2 | 3 |
| Kind of polymer | | | F | G | H | I | J |
| Polymerization initiator | | Kind | BuLi | BuLi | BuLi | BuLi | BuLi |
|  | | Amount (mmole) | 0.42 | 0.42 | 0.42 | 0.42 | 0.42 |
| First stage modification | Modifying agent | Kind | GPMOS | GPEOS | TEOS | TEOS | TEOS |
|  |  | Amount (mmole) | 0.352 | 0.352 | 0.38 | 0.38 | 0.38 |
| Second stage modification | Modifying agent | Kind | — | — | TEOSPDI | DMBTESPA | APTES |
|  |  | Amount (mmole) | — | — | 0.38 | 0.38 | 0.38 |
|  | Condensing agent | Kind | — | — | BEHAS | BEHAS | BEHAS |
|  |  | Amount (mmole) | — | — | 2.28 | 2.28 | 2.28 |
| Characteristic | Molecular weight (×10$^4$) | Base Mw | 20.4 | 20.6 | 21.0 | 20.6 | 20.2 |
|  |  | Total Mw | 29.4 | 29.1 | 47.1 | 43.6 | 44.1 |
|  | Micro structure (wt %) | Styrene unit content | 20.6 | 21.0 | 19.8 | 20.3 | 20.1 |
|  |  | Vinyl group content | 55 | 58 | 56 | 57 | 57 |
| Mooney viscosity (ML$_{1+4}$/100° C.) | | | 38 | 36 | 55 | 54 | 53 |

TABLE 1-3

|  |  |  | Production Example | | | | |
|---|---|---|---|---|---|---|---|
|  |  |  | 4 | 5 | 6 | 7 | 8 |
| Kind of polymer | | | K | L | M | N | O |
| Polymerization initiator | | Kind | BuLi | BuLi | BuLi | BuLi | BuLi |
|  | | Amount (mmole) | 0.42 | 0.42 | 0.42 | 0.42 | 0.42 |
| First stage modification | Modifying agent | Kind | TEOS | TEOS | TEOS | TEOS | TEOS |
|  |  | Amount (mmole) | 0.38 | 0.38 | 0.38 | 0.38 | 0.38 |
| Second stage modification | Modifying agent | Kind | DMAPTMS | MAPTMS | HMTES | OTMSAC | APTMOS |
|  |  | Amount (mmole) | 0.38 | 0.38 | 0.38 | 0.38 | 0.38 |
|  | Condensing agent | Kind | BEHAS | BEHAS | BEHAS | BEHAS | BEHAS |
|  |  | Amount (mmole) | 2.28 | 2.28 | 2.28 | 2.28 | 2.28 |
| Characteristic | Molecular weight (×10$^4$) | Base Mw | 21.1 | 20.9 | 20.5 | 19.9 | 20.3 |
|  |  | Total Mw | 43.1 | 41.8 | 45.6 | 42.8 | 44.6 |
|  | Micro structure (wt %) | Styrene unit content | 19.8 | 19.9 | 19.5 | 20.6 | 19.5 |
|  |  | Vinyl group content | 56 | 58 | 56 | 58 | 57 |
| Mooney viscosity (ML$_{1+4}$/100° C.) | | | 53 | 54 | 53 | 55 | 54 |

TABLE 1-4

|  |  |  | Production Example | | | | |
|---|---|---|---|---|---|---|---|
|  |  |  | 9 | 10 | 11 | 12 | 13 |
| Kind of polymer | | | P | Q | R | S | T |
| Polymerization initiator | | Kind | BuLi | BuLi | BuLi | BuLi | BuLi |
|  | | Amount (mmole) | 0.42 | 0.42 | 0.42 | 0.42 | 0.42 |
| First stage modification | Modifying agent | Kind | TEOS | TEOSPDI | TEOS | DMBTESPA | GPMOS |
|  |  | Amount (mmole) | 0.38 | 0.38 | 0.38 | 0.38 | 0.38 |
| Second stage modification | Modifying agent | Kind | TMSEP | TEOSPDI | AEAPEOS | TEOSPDI | TEOSPDI |
|  |  | Amount (mmole) | 0.38 | 0.38 | 0.38 | 0.38 | 0.38 |
|  | Condensing agent | Kind | BEHAS | BEHAS | BEHAS | BEHAS | BEHAS |
|  |  | Amount (mmole) | 2.28 | 2.28 | 2.28 | 2.28 | 2.28 |
| Characteristic | Molecular weight (×10$^4$) | Base Mw | 20.7 | 21.0 | 20.0 | 20.5 | 21.0 |
|  |  | Total Mw | 45.1 | 33.7 | 41.6 | 28.0 | 31.4 |
|  | Micro structure (wt %) | Styrene unit content | 20.2 | 20.4 | 20.0 | 20.0 | 20.1 |
|  |  | Vinyl group content | 56 | 57 | 57 | 58 | 58 |
| Mooney viscosity (ML$_{1+4}$/100° C.) | | | 55 | 38 | 51 | 39 | 40 |

TABLE 1-5

|  |  | Production Example | | | Comparative Production Example |
|---|---|---|---|---|---|
|  |  | 14 | 15 | 16 | 8 |
| Kind of polymer | | U | V | W | X |
| Polymerization initiator | Kind | BuLi | BuLi | HMI | HMI |
|  | Amount (mmole) | 0.42 | 0.42 | 0.42 | 0.42 |
| First stage modification | Modifying agent Kind | GPEOS | TEOS | TEOS | TEOS |
|  | Amount (mmole) | 0.38 | 0.38 | 0.38 | 0.352 |
| Second stage modification | Modifying agent Kind | TEOSPDI | TEOSPDI | TEOSPDI | — |
|  | Amount (mmole) | 0.38 | 0.38 | 0.38 | — |
|  | Condensing agent Kind | BEHAS | TEHO | BEHAS | — |
|  | Amount (mmole) | 2.28 | 2.28 | 2.28 | — |
| Characteristic | Molecular weight ($\times 10^4$) Base Mw | 20.7 | 21.2 | 19.3 | 19.8 |
|  | Total Mw | 30.5 | 45.0 | 42.7 | 40.9 |
| Micro structure (wt %) | Styrene unit content | 19.7 | 20.6 | 20.2 | 19.8 |
|  | Vinyl group content | 56 | 57 | 57 | 57 |
| Mooney viscosity ($ML_{1+4}/100°$ C.) | | 42 | 58 | 39 | 34 |

Remarks:
Base Mw: weight-average molecular weight (Mw) before modification reaction
Total Mw: weight-average molecular weight (Mw) after first stage modification reaction
BEHAS: tin bis(2-ethylhexanoate)
TEHO: titanium tetrakis(2-ethylhexyl oxide)
HMI: hexamethyleneiminolithium synthesized in the polymerization system
TEOS: tetraethoxysilane
TTC: tin tetrachloride
TEOSPDI: N-(3-triethoxysilylpropyl)-4,5-dihydroimidazole
DMBTESPA: N-(1,3-dimethylbutylidene)-3-triethoxysilyl)-1-propane amine
GPMOS: 3-glycidoxypropyltrimethoxysilane
GPEOS: 3-glycidoxypropyltriethoxysilane
APTES: 3-aminopropyltriethoxysilane
DMAPTMS: 3-(N,N-dimethylamino)propyltrimethoxysilane
MAPTMS: 3-(N-methylamino)propyltrimethoxysilane
HMTES: hydroxymethyltriethoxysilane
OTMSAC: octadecyldimethyl(3-trimethoxysilylpropyl)-ammonium chloride
APTMOS: aminophenyltrimethoxysilane
TMSEP: 2-(trimethoxysilylethyl)pyridine
AEAPEOS: 2-(6-aminoethyl)-3-aminopropyl-trimethoxysilane

Examples 1 to 16 and Comparative Examples 1 to 8

The polymers prepared in Production Examples 1 to 16 and Comparative Production Examples 1 to 8 were used to prepare silica-blended rubber compositions and carbon black-blended rubber compositions according to a composition 1 and a composition 2 each shown in Table 2 by methods shown below, and the rubber compositions were measured for a Mooney viscosity and then vulcanized on the conditions of 160° C. and 15 minutes. The physical properties of the vulcanized rubbers were measure, and the results thereof are shown in Table 3.

Composition 1 Silica-blended:
Silica, aroma oil, stearic acid, a coupling agent and an antioxidant 6C were blended with 100 parts by weight of the polymer of a kind shown in Table 3 according to a composition 1 shown in Table 2 to prepare a master batch, and zinc oxide, a vulcanization-accelerating agent DPG, DM, NS and sulfur were further blended to prepare a silica-blended rubber composition.

Composition 2 Carbon Black-blended:
Carbon black, aroma oil, stearic acid, a coupling agent and the antioxidant 6C were blended with 100 parts by weight of the polymer of a kind shown in Table 3 according to a composition 2 shown in Table 2 to prepare a master batch, and zinc oxide, the vulcanization-accelerating agent DPG, DM, NS and sulfur were further blended to prepare a carbon black-blended rubber composition.

TABLE 2

|  |  |  | Composition 1 (part by weight) | Composition 2 (part by weight) |
|---|---|---|---|---|
| First stage | Polymer | | 100 | 100 |
|  | Carbon black | | — | 50 |
|  | Silica | | 55 | — |
|  | Aroma oil | | 10 | 10 |
|  | Stearic acid | | 2 | 2 |
|  | Coupling agent | | 5.5 | — |
|  | Antioxidant 6C | | 1 | 1 |
| Second stage | Zinc oxide | | 3 | 3 |
|  | Vulcanization-accelerating agent | DPG | 1 | 0.5 |
|  |  | DM | 1 | 0.5 |
|  |  | NS | 1 | 0.5 |
|  | Sulfur | | 1.5 | 1.5 |

Remarks:
Silica: [Nipsil AQ (brand name)] manufactured by Nippon Silica Ind. Co., Ltd.
Carbon black: [Seast KH (N339) (brand name)] manufactured by Tokai Carbon Co., Ltd.
Coupling agent: silane coupling agent [Si69 (brand name)] manufactured by Degussa Co., Ltd., bis(3-triethoxysilylpropyl)tetrasulfide
Antioxidant 6C: N-(1,3-dimethylbutyl)-N'-phenyl-p-phenylenediamine Vulcanization-accelerating agent DPG:
 diphenylquanidine
Vulcanization-accelerating agent DM:
 mercaptobenzothiazyl disulfide
Vulcanization-accelerating agent NS:
 N-t-butyl-2-benzothiazylsulfenamide

TABLE 3-1

|  |  | Comparative Example | | | | |
|---|---|---|---|---|---|---|
|  |  | 1 | 2 | 3 | 4 | 5 |
| Kind of polymer |  | A | B | C | D | E |
| Silica-blended rubber composition | Mooney viscosity [$ML_{1+4}$/130° C.] | 58 | 63 | 62 | 62 | 69 |
|  | Tensile strength [$T_b$] (MPa) | 18.5 | 19.8 | 18.6 | 22.5 | 21.8 |
|  | Low heat buildup property [tan δ] | 0.138 | 0.131 | 0.141 | 0.093 | 0.098 |
|  | Abrasion resistance | 100 | 107 | 95 | 124 | 124 |
| Carbon black-blended rubber composition | Mooney viscosity [$ML_{1+4}$/130° C.] | 52 | 59 | 63 | 61 | 66 |
|  | Tensile strength [$T_b$] (MPa) | 20.7 | 21.7 | 22.5 | 22.7 | 22.4 |
|  | Low heat buildup property [tan δ] | 0.151 | 0.145 | 0.127 | 0.122 | 0.124 |
|  | Abrasion resistance | 100 | 102 | 110 | 117 | 115 |

(The abrasion resistance is a value shown by an index, wherein the value of Comparative Example 1 was set to 100)

TABLE 3-2

|  |  | Comparative Example | | Example | | |
|---|---|---|---|---|---|---|
|  |  | 6 | 7 | 1 | 2 | 3 |
| Kind of polymer |  | F | G | H | I | J |
| Silica-blended rubber composition | Mooney viscosity [$ML_{1+4}$/130° C.] | 64 | 63 | 66 | 71 | 65 |
|  | Tensile strength [$T_b$] (MPa) | 20.4 | 20.6 | 22.4 | 22 | 22.3 |
|  | Low heat buildup property [tan δ] | 0.125 | 0.127 | 0.081 | 0.085 | 0.084 |
|  | Abrasion resistance | 110 | 108 | 136 | 133 | 130 |
| Carbon black-blended rubber composition | Mooney viscosity [$ML_{1+4}$/130° C.] | 60 | 58 | 64 | 68 | 62 |
|  | Tensile strength [$T_b$] (MPa) | 21.4 | 21.6 | 22.9 | 23 | 22.6 |
|  | Low heat buildup property [tan δ] | 0.141 | 0.143 | 0.108 | 0.111 | 0.113 |
|  | Abrasion resistance | 103 | 102 | 127 | 125 | 124 |

(The abrasion resistance is a value shown by an index, wherein the value of Comparative Example 1 was set to 100)

TABLE 3-3

|  |  | Example | | | | |
|---|---|---|---|---|---|---|
|  |  | 4 | 5 | 6 | 7 | 8 |
| Kind of polymer |  | K | L | M | N | O |
| Silica-blended rubber composition | Mooney viscosity [$ML_{1+4}$/130° C.] | 62 | 63 | 66 | 67 | 64 |
|  | Tensile strength [$T_b$] (MPa) | 21.9 | 22.4 | 22.2 | 22.5 | 22.6 |
|  | Low heat buildup property [tan δ] | 0.089 | 0.086 | 0.088 | 0.083 | 0.088 |
|  | Abrasion resistance | 127 | 129 | 132 | 128 | 128 |

TABLE 3-3-continued

|  |  | Example |  |  |  |  |
|---|---|---|---|---|---|---|
|  |  | 4 | 5 | 6 | 7 | 8 |
| Carbon black-blended rubber composition | Mooney viscosity [$ML_{1+4}$/130° C.] | 60 | 61 | — | 63 | 64 |
|  | Tensile strength [$T_b$] (MPa) | 22.7 | 22.5 | — | 22.4 | 22.3 |
|  | Low heat buildup property [tan δ] | 0.118 | 0.115 | — | 0.114 | 0.116 |
|  | Abrasion resistance | 121 | 123 | — | 122 | 123 |

(The abrasion resistance is a value shown by an index, wherein the value of Comparative Example 1 was set to 100)

TABLE 3-4

|  |  | Example |  |  |  |  |
|---|---|---|---|---|---|---|
|  |  | 9 | 10 | 11 | 12 | 13 |
| Kind of polymer |  | P | Q | R | S | T |
| Silica-blended rubber composition | Mooney viscosity [$ML_{1+4}$/130° C.] | 68 | 70 | 72 | 74 | 71 |
|  | Tensile strength [$T_b$] (MPa) | 21.9 | 22.6 | 22.3 | 22.3 | 22.7 |
|  | Low heat buildup property [tan δ] | 0.083 | 0.076 | 0.085 | 0.080 | 0.079 |
|  | Abrasion resistance | 132 | 140 | 132 | 136 | 138 |
| Carbon black-blended rubber composition | Mooney viscosity [$ML_{1+4}$/130° C.] | 63 | 68 | 67 | 70 | 67 |
|  | Tensile strength [$T_b$] (MPa) | 22.6 | 23.1 | 22.6 | 22.9 | 23.2 |
|  | Low heat buildup property [tan δ] | 0.113 | 0.103 | 0.109 | 0.107 | 0.106 |
|  | Abrasion resistance | 124 | 131 | 122 | 128 | 128 |

(The abrasion resistance is a value shown by an index, wherein the value of Comparative Example 1 was set to 100)

TABLE 3-5

|  |  | Example |  |  | Comparative Example |
|---|---|---|---|---|---|
|  |  | 14 | 15 | 16 | 8 |
| Kind of polymer |  | U | V | W | X |
| Silica-blended rubber composition | Mooney viscosity [$ML_{1+4}$/130° C.] | 70 | 69 | 72 | 68 |
|  | Tensile strength [$T_b$] (MPa) | 22.5 | 21.9 | 22.7 | 23.1 |
|  | Low heat buildup property [tan δ] | 0.081 | 0.085 | 0.071 | 0.089 |
|  | Abrasion resistance | 137 | 132 | 144 | 125 |
| Carbon black-blended rubber composition | Mooney viscosity [$ML_{1+4}$/130° C.] | 69 | 68 | 70 | 68 |
|  | Tensile strength [$T_b$] (MPa) | 22.7 | 22.7 | 23.5 | 23.0 |
|  | Low heat buildup property [tan δ] | 0.108 | 0.111 | 0.098 | 0.117 |
|  | Abrasion resistance | 126 | 123 | 134 | 120 |

(The abrasion resistance is a value shown by an index, wherein the value of Comparative Example 1 was set to 100)

It can be found from the results described above that the modified polymers of the present invention (Examples 1 to 16) inhibit a rise in the Mooney viscosity and markedly raise the low heating property and the abrasion resistance without damaging the fracture characteristic in either case of silica blending and carbon black blending.

INDUSTRIAL APPLICABILITY

According to the present invention, capable of being provided is a modified polymer which enhances interactions with silica and carbon black when used for both of silica-blended and carbon black-blended rubber compositions and which elevates the fracture characteristic, the abrasion resistance and the low heat buildup property at the same time and can exhibit a good workability.

What is claimed is:

1. A process for producing a modified polymer, characterized by carrying out primary modification in which a hydrocarbyloxysilane compound I is reacted with the active site of a polymer having an active site of an organic metal in a molecule and then carrying out secondary modification in which the hydrocarbyloxysilane compound II or unreacted hydrocarbyloxysilane compound I is further reacted therewith.

2. The process for producing a modified polymer as described in claim 1, wherein the polymer described above is obtained by homopolymerizing a conjugated diene compound or copolymerizing a conjugated diene compound with at least one other monomers.

3. The process for producing a modified polymer as described in claim 1, wherein the organic metal in the active site of a polymer is at least one selected from an alkaline metal and an alkaline earth metals.

4. The process for producing a modified polymer as described in claim 2, wherein the polymer is synthesized by anionic polymerization, and the at least one other monomer is an aromatic vinyl compound.

5. The process for producing a modified polymer as described in claim 4, wherein the active site described above is present at an end of the polymer, and at least a part thereof stays in an active state.

6. The process for producing a modified polymer as described in claim 1, wherein the hydrocarbyloxysilane compound I used for the primary modification is at least one selected from a hydrocarbyloxysilane compound represented by Formula (I):

(wherein $A^1$ represents a monovalent group having at least one functional group selected from (thio)epoxy, (thio)isocyanate, (thio)ketone, (thio)aldehyde, cyan, pyridine, imine, amide, trihidorocarbyl ester of isocyanuric acid, (thio)carboxylic acid ester, metal salts of (thio)carboxylic acid ester, carboxylic anhydride, carboxylic halides and dihydrocarbyl ester carbonate; $R^1$ represents a single bond or a divalent inert hydrocarbon group; $R^2$ and $R^3$ each represent independently a monovalent aliphatic hydrocarbon group having 1 to 20 carbon atoms or a monovalent aromatic hydrocarbon group having 6 to 18 carbon atoms; n is an integer of 0 to 2, and when a plurality of $OR^3$ is present, a plurality of $OR^3$ may be the same as or different from each other; and an active proton and an onium salt are not contained in the molecule) and/or a partially condensed product thereof, a hydrocarbyloxysilane compound represented by Formula (II):

(wherein $A^2$ represents a monovalent group having at least one functional group selected from cyclic tertiary amine, non-cyclic tertiary amine, pyridine, cyan, sulfide and multisulfide; $R^4$ represents a single bond or a divalent inert hydrocarbon group; $R^5$ and $R^6$ each represent independently a monovalent aliphatic hydrocarbon group having 1 to 20 carbon atoms or a monovalent aromatic hydrocarbon group having 6 to 18 carbon atoms; m is an integer of 0 to 2, and when a plurality of $OR^6$ is present, a plurality of $OR^6$ may be the same as or different from each other; and an active proton and an onium salt are not contained in the molecule) and/or a partially condensed product thereof, and a hydrocarbyloxysilane compound represented by Formula (III):

(wherein $R^7$ and $R^8$ each represent independently a monovalent aliphatic hydrocarbon group having 1 to 20 carbon atoms or a monovalent aromatic hydrocarbon group having 6 to 18 carbon atoms; p is an integer of 0 to 2, and when a plurality of $OR^8$ is present, a plurality of $OR^8$ may be the same as or different from each other; and an active proton and an onium salt are not contained in the molecule) and/or a partially condensed product thereof.

7. The process for producing a modified polymer as described in claim 6, wherein the hydrocarbyloxysilane compound II used for the secondary modification is at least one selected from the hydrocarbyloxysilane compound represented by Formula (I) described above and/or the partially condensed product thereof, the hydrocarbyloxysilane compound represented by Formula (II) described above and/or the partially condensed product thereof and a hydrocarbyloxysilane compound represented by Formula (IV):

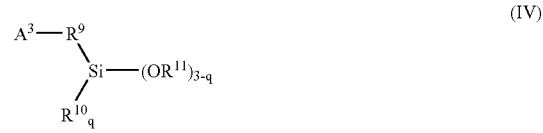

(wherein $A^3$ represents a monovalent group having at least one functional group selected from alcohol, thiol, amide, primary amine or an onium salt thereof, cyclic secondary amine or an onium salt thereof, non-cyclic secondary amine or an onium salt thereof, cyclic tertiary amine or an onium salt thereof, non-cyclic tertiary amine or an onium salt thereof, a group having an aryl or benzyl Sn bond, sulfonyl, sulfinyl and nitrile; $R^9$ represents a single bond or a divalent inert hydrocarbon group; $R^{10}$ and $R^{11}$ each represent independently a monovalent aliphatic hydrocarbon group having 1 to 20 carbon atoms or a monovalent aromatic hydrocarbon group having 6 to 18 carbon atoms; q is an integer of 0 to 2, and when a plurality of $OR^{11}$ is present, a plurality of $OR^{11}$ may be the same as or different from each other) and/or a partially condensed product thereof.

8. The process for producing a modified polymer as described in claim 6, wherein the hydrocarbyloxysilane compound I for the primary modification is added to the polymer having an active site of an organic metal and reacted to introduce the hydrocarbyloxysilane compound residue into the above active site, and then the hydrocarbyloxysilane compound II for the secondary modification is added to the reaction system and condensed with the hydrocarbyloxysilane compound residue introduced into the active site.

9. The process for producing a modified polymer as described in claim 6, wherein the hydrocarbyloxysilane compound I for the primary modification is added to the polymer having an active site of an organic metal and reacted to introduce the hydrocarbyloxysilane compound residue into the above active site, and then the secondary modification is carried out in which the unreacted hydrocarbyloxysilane compound I is condensed with the hydrocarbyloxysilane compound residue introduced into the active site.

10. The process for producing a modified polymer as described in claim 1, wherein a condensation-accelerating agent is added to the reaction system in the secondary modification.

11. The process for producing a modified polymer as described in claim 10, wherein the condensation-accelerating agent is a combination of carboxylate of tin and/or titanium alkoxide and water.

12. The process for producing a modified polymer as described in claim 11, wherein the carboxylate of tin is a tin compound having an oxidation number of 2 represented by the following Formula (V):

$$Sn(OCOR^{12})_2 \qquad (V)$$

(wherein $R^{12}$ represents an alkyl group having 2 to 19 carbon atoms) or a tin compound having an oxidation number of 4 represented by the following Formula (VI):

$$R^{13}{}_x SnA^4{}_y B^1{}_{4-y-x} \qquad (VI)$$

(wherein $R^{13}$ represents an aliphatic hydrocarbon group having 1 to 30 carbon atoms; x is an integer of 1 to 3, and y is 1 or 2; and $A^4$ represents a group selected from a carboxyl group having 2 to 30 carbon atoms, an α,γ-dionyl group having 5 to 20 carbon atoms, a hydrocarbyloxy group having 3 to 20 carbon atoms and a siloxy group which is tri-substitute with a hydrocarbyl group having 1 to 20 carbon atoms and/or a hydrocarbyloxy group having 1 to 20 carbon atoms; $B^1$ is represents hydroxyl group or halogen atoms), and the titanium alkoxide described above is a titanium compound represented by the following Formula (VII):

$$A^5{}_z TiB^2{}_{4-z} \qquad (VII)$$

(wherein $A^5$ represents a group selected from an alkoxy group having 3 to 20 carbon atoms and a siloxy group which is tri-substitute with an alkyl group having 1 to 20 carbon atoms and/or an alkoxy group having 1 to 20 carbon atoms; $B^2$ represents an α,γ-dionyl group having 5 to 20 carbon atoms; and z is 2 or 4).

13. The process for producing a modified polymer as described in claim 2, wherein the conjugated diene compound described above is 1,3-butadiene or isoprene.

14. The process for producing a modified polymer as described in claim 4, wherein the aromatic vinyl compound is styrene.

* * * * *